(12) United States Patent
Stapp et al.

(10) Patent No.: US 10,101,092 B2
(45) Date of Patent: Oct. 16, 2018

(54) POWER GENERATION SYSTEM INCLUDING MULTIPLE CORES

(71) Applicant: Peregrine Turbine Technologies, LLC, Wiscasset, ME (US)

(72) Inventors: David S. Stapp, Wiscasset, ME (US); Robert Brooks, Wiscasset, ME (US)

(73) Assignee: Peregrine Turbine Technologies, LLC, Wiscasset, ME (US)

( * ) Notice: Subject to any disclaimer, the term of this patent is extended or adjusted under 35 U.S.C. 154(b) by 362 days.

(21) Appl. No.: 14/833,004

(22) Filed: Aug. 21, 2015

(65) Prior Publication Data

US 2016/0053638 A1 Feb. 25, 2016

Related U.S. Application Data

(60) Provisional application No. 62/040,988, filed on Aug. 22, 2014.

(51) Int. Cl.

| F01K 25/10 | (2006.01) |
|---|---|
| F28D 9/00 | (2006.01) |
| F01K 23/10 | (2006.01) |
| F02C 1/04 | (2006.01) |
| F01K 13/00 | (2006.01) |
| F01K 13/02 | (2006.01) |

(Continued)

(52) U.S. Cl.
CPC .......... *F28D 9/0006* (2013.01); *F01K 13/00* (2013.01); *F01K 13/02* (2013.01); *F01K 23/10* (2013.01); *F01K 25/103* (2013.01); *F02C 1/04* (2013.01); *F02C 1/10* (2013.01); *F28D 9/0025* (2013.01); *F28D 21/0003* (2013.01); *F28F 3/08* (2013.01); *F28F 9/001* (2013.01); *F28F 9/0075* (2013.01); *F28F 2009/004* (2013.01); *F28F 2009/0285* (2013.01); *F28F 2265/26* (2013.01)

(58) Field of Classification Search
CPC .......... F01K 25/103; F01K 23/10; F02C 1/04; F02C 1/10; F02C 3/04; F02C 6/18
See application file for complete search history.

(56) References Cited

U.S. PATENT DOCUMENTS 2,621,475 A * 12/1952 Loy .......................... F02C 3/34
                                                          60/39.17
3,058,018 A    10/1962 Deming et al.
(Continued)

FOREIGN PATENT DOCUMENTS

EP     2402697 A1    1/2012
FR      810379 A     3/1937
(Continued)

OTHER PUBLICATIONS

Dostal, Supercritical Carbon Dioxide Cycle for Next Generation Nuclear Reactor, Advanced Nuclear Power Technology Program, Mar. 2004, 326 pgs.

(Continued)

*Primary Examiner* — Mark Laurenzi
*Assistant Examiner* — Shafiq Mian
(74) *Attorney, Agent, or Firm* — Baker & Hostetler LLP (57) ABSTRACT

The present disclosure relates to a power generation system and related methods that use closed supercritical fluid cycles, and in particular, to a power generation system and related methods where multiple cores may be selectively operated to adjust power levels generated by the system.

26 Claims, 5 Drawing Sheets

(51) Int. Cl.
*F02C 1/10* (2006.01)
*F28F 9/00* (2006.01)
*F28F 9/007* (2006.01)
*F28D 21/00* (2006.01)
*F28F 3/08* (2006.01)
*F28F 9/02* (2006.01)

(56) References Cited

U.S. PATENT DOCUMENTS

| | | | |
|---|---|---|---|
| 3,583,156 A * | 6/1971 | Schabert | F02C 1/10 376/298 |
| 3,788,066 A * | 1/1974 | Nebgen | F01K 17/06 60/39.55 |
| 3,791,137 A * | 2/1974 | Jubb | F02C 1/05 122/4 D |
| 3,913,315 A * | 10/1975 | Skinner | F02C 1/007 60/39.181 |
| 3,971,211 A | 7/1976 | Wethe et al. | |
| 4,138,618 A | 2/1979 | Jaeschke | |
| 4,166,362 A * | 9/1979 | Laurent | F01K 25/085 376/402 |
| 4,263,964 A | 4/1981 | Masai et al. | |
| 4,267,692 A | 5/1981 | Earnest | |
| 4,347,711 A * | 9/1982 | Noe | F01K 23/101 60/39.181 |
| 4,375,745 A | 3/1983 | Schelp | |
| 4,498,289 A | 2/1985 | Osgerby | |
| 4,520,284 A | 5/1985 | Wolcott | |
| 4,537,032 A | 8/1985 | Kaplan | |
| 4,640,665 A * | 2/1987 | Staroselsky | F02C 6/00 415/1 |
| 4,683,392 A | 7/1987 | MacDonald et al. | |
| 4,780,637 A | 10/1988 | Wolcott | |
| 5,231,835 A * | 8/1993 | Beddome | F25J 1/0015 62/615 |
| 5,323,603 A * | 6/1994 | Malohn | F02C 7/10 60/39.183 |
| 5,347,806 A * | 9/1994 | Nakhamkin | F01K 21/047 60/39.17 |
| 5,778,675 A * | 7/1998 | Nakhamkin | F02C 6/16 60/39.17 |
| 5,799,484 A * | 9/1998 | Nims | F01D 15/10 290/4 D |
| 5,813,215 A | 9/1998 | Weisser | |
| 6,141,953 A * | 11/2000 | Mongia | F02C 3/22 60/39.17 |
| 6,161,392 A * | 12/2000 | Jirnov | F25B 9/002 62/87 |
| 6,191,561 B1 | 2/2001 | Bartel | |
| 6,220,053 B1 * | 4/2001 | Hass, Jr. | F25J 1/0015 62/613 |
| 6,318,066 B1 | 11/2001 | Skowronski | |
| 6,430,916 B2 | 8/2002 | Sugishita et al. | |
| 6,606,864 B2 | 8/2003 | MacKay | |
| 6,848,249 B2 | 2/2005 | Coleman et al. | |
| 6,945,052 B2 | 9/2005 | Frutschi et al. | |
| 6,991,026 B2 | 1/2006 | Costen et al. | |
| 7,037,430 B2 | 5/2006 | Donaldson et al. | |
| 7,669,423 B2 | 3/2010 | Nakhamkin | |
| 7,685,820 B2 | 3/2010 | Litwin et al. | |
| 7,726,114 B2 | 6/2010 | Evulet | |
| 7,880,355 B2 | 2/2011 | Qu et al. | |
| 7,966,868 B1 | 6/2011 | Sonnichsen et al. | |
| 9,540,999 B2 * | 1/2017 | Stapp | F02C 3/04 |
| 2001/0023580 A1 * | 9/2001 | Sugishita | F01K 23/10 60/39.12 |
| 2002/0063479 A1 * | 5/2002 | Mitchell | F01D 15/10 307/153 |
| 2007/0125063 A1 * | 6/2007 | Evulat | F02C 6/10 60/39.15 |
| 2007/0137211 A1 * | 6/2007 | Callas | F02C 6/02 60/772 |
| 2009/0211260 A1 * | 8/2009 | Kesseli | F02C 1/02 60/786 |
| 2010/0101231 A1 | 4/2010 | Westmeier | |
| 2010/0242429 A1 | 9/2010 | Smith | |
| 2011/0094231 A1 * | 4/2011 | Freund | F02C 1/02 60/727 |
| 2011/0179799 A1 | 7/2011 | Allam et al. | |
| 2011/0206173 A1 | 8/2011 | Walters | |
| 2012/0000204 A1 * | 1/2012 | Kesseli | F02C 3/107 60/778 |
| 2012/0096869 A1 * | 4/2012 | Kesseli | F02C 3/20 60/772 |
| 2012/0216536 A1 | 8/2012 | Ma et al. | |
| 2013/0042601 A1 * | 2/2013 | Kraft | F15B 1/022 60/327 |
| 2013/0180259 A1 * | 7/2013 | Stapp | F02C 3/04 60/773 |

FOREIGN PATENT DOCUMENTS

| | | |
|---|---|---|
| FR | 1391514 A | 3/1965 |
| WO | 1995/24822 A2 | 9/1995 |
| WO | 2010/151560 A1 | 12/2010 |
| WO | 2015/130898 A1 | 9/2015 |

OTHER PUBLICATIONS

Wright, Operation and Analysis of a Supercritical CO2 Brayton Cycle, Sandia National Laboratories, Sep. 2010, 101 pgs.

International Patent Application No. PCT/US2015/046415: International Search Report and Written Opinion dated Dec. 3, 2015, 13 pages.

International Patent Application No. PCT/US2015/046400: International Search Report and Written Opinion dated Dec. 4, 2015, 11 pages.

* cited by examiner

POWER GENERATION SYSTEM INCLUDING MULTIPLE CORES

CROSS REFERENCE TO RELATED APPLICATIONS

The present application claims priority to and the benefit of U.S. Provisional Application No. 62/040,988, filed Aug. 22, 2014, the entire contents of which are incorporated by reference into this application in their entirety.

TECHNICAL FIELD

The present disclosure relates to a power generation system and related methods that use supercritical fluids, and in particular, to a power generation system and related methods where multiple cores may be selectively activated or deactivated to adjust the amount of power generated.

BACKGROUND

Traditionally, thermodynamic power generation cycles, such as the Brayton cycle, employ an ideal gas, such as atmospheric air. Such cycles are open in the sense that after the air flows through the components of the cycle, it is exhausted back to atmosphere at a relatively high temperature so that a considerable amount heat generated by the combustion of fuel is lost from the cycle. A common approach to capturing and utilizing waste heat in a Brayton cycle is to use a recuperator to extract heat from the turbine exhaust gas and transfer it, via a heat exchanger, to the air discharging from the compressor. Since such heat transfer raises the temperature of the air entering the combustor, less fuel is required to achieve the desired turbine inlet temperature. The result is improved thermal efficiencies for the overall thermodynamic cycle and generally results in efficiencies as high as about 40%. Larger turbines with more advanced blade aerodynamic design may achieve even greater efficiencies. However, even in such recuperated cycles, the thermal efficiency is limited by the fact that the turbine exhaust gas temperature can never be cooled below that of the compressor discharge air, since heat can only flow from a high temperature source to a low temperature sink. This is exacerbated by the fact that employing higher pressure ratios, which improves the efficiency of the turbine overall, results in higher compressor discharge temperature and, therefore, less heat recovery in the recuperator. In addition, the compressor typically requires multiple compressor stages to achieve the higher pressure ratios. And parts of the turbine must frequently be manufactured from expensive materials able to withstand very high temperatures in order for the power generation cycle to operate at maximum efficiency. Thus, the increase in efficiency and power output drastically increases the cost of the power generation turbomachinery.

More recently, interest has arisen concerning the use of supercritical fluids, such as supercritical carbon dioxide ("SCO2"), in closed thermodynamic power generation cycles. Advantageously, supercritical fluids—that is, a fluid at or above the "critical point" at which the liquid and gaseous phases are in equilibrium—have a density and compressibility approaching that of a liquid so that the work required to compress the fluid to the desired pressure ratio is much lower than it would be for an ideal gas, such as air. As a result, supercritical fluid power generation cycles utilize less expensive single-stage compressor and turbine turbomachinery.

SUMMARY

There is a need for a system and method for efficiently generating sufficient power using a supercritical fluid in a thermodynamic cycle to satisfy an application's normal operational power load, while also providing the ability to ramp up power and satisfy the application's maximum power requirement.

An embodiment of the present disclosure is a method for generating power in a system that includes a supercritical fluid cycle having a supercritical fluid flowing therethrough, and an air-breathing cycle having air flowing therethrough that does not mix with the flow of the supercritical fluid. The method includes the steps of directing the supercritical fluid through a first core of a plurality of cores disposed along the supercritical fluid cycle, each core including a compressor, and a turbine. The method includes compressing the supercritical fluid in the compressor of the first core such that the supercritical fluid is discharged from the compressor of the first core as a compressed supercritical fluid. The method includes transferring heat to the compressed supercritical fluid from the air in the air-breathing cycle in at least one heat exchanger such that the compressed supercritical fluid is discharged from the at least one heat exchanger as a heated supercritical fluid. The method includes directing at least a portion of the heated supercritical fluid from the at least one heat exchanger to the turbine of the first core. The method includes expanding the at least a portion of the heated supercritical fluid in the turbine of the first core such that the first core generates a first level of power in an output device. And activating at least a second core of the plurality of cores such the second core increases the first level power generated in the output device to a second level of power that is greater than the first level of power.

Another embodiment of the present disclosure is a system configured to generate power including at least a supercritical fluid cycle having a supercritical fluid flowing therethrough. The system includes a plurality of cores disposed along the supercritical fluid cycle, each core including a compressor and a turbine. Each core is configured to be selectively operated so as to generate a power output. The system also includes a plurality of heat exchangers disposed along the supercritical fluid cycle, where at least one of the plurality of heat exchangers is configured to be in fluid communication with each one of the plurality of cores. A first core of the plurality of cores is configured to generate a first level of power when the first core is in operation, and a second core of the plurality of cores is configured to increase the first level of power to a second level of power that is greater than the first level of power when the first and second cores are in operation.

Another embodiment of the present disclosure is an engine including a supercritical fluid cycle and an air-breathing cycle. The engine is configured to produce multiple levels of power output. The engine includes a plurality of cores disposed along the supercritical fluid cycle, each core including a compressor and a turbine. Each core is configured to be selectively operated so as to generate a power output. The engine also includes a plurality of heat exchangers disposed along the supercritical fluid cycle, where at least one of the plurality of heat exchangers is configured to be in fluid communication with each one of the plurality of cores. The engine is configured to adjust the number of cores of the plurality cores in operation so as to adjust the power output.

BRIEF DESCRIPTION OF THE DRAWINGS

The foregoing summary, as well as the following detailed description of an embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings.

DETAILED DESCRIPTION

Embodiments of the present disclosure include system, method, and engines that are configured to selectively increase power output by selectively activating one or more cores containing a compressor and a turbine. Typical thermodynamic power generation cycles are frequently used in applications, such as naval propulsion, where the normal required power output is 15-20% of the power generation cycle's maximum power output. Nevertheless, typical thermodynamic power generation cycles are designed for maximum efficiency at 100% capacity, which leads to inefficiencies when the cycle is operated at a lower load. Accordingly, a supercritical fluid cycle that includes multiple cores, which are capable of being selectively activated or deactivated, is able to maximize efficiency. The described system may be designed to operate on a single core under normal load conditions and configured to ramp up power output by adding additional cores to generate additional power when necessary. Systems that utilize multiple cores as disclosed herein may include power generation systems as disclosed in U.S. Patent App. Pub. No. 2013/0180259, ("the 259 publication"), and International Patent App. No. PCT/US2015/017679, ("the 679 application"), the disclosures of which are incorporated by reference herein.

Figure 1:
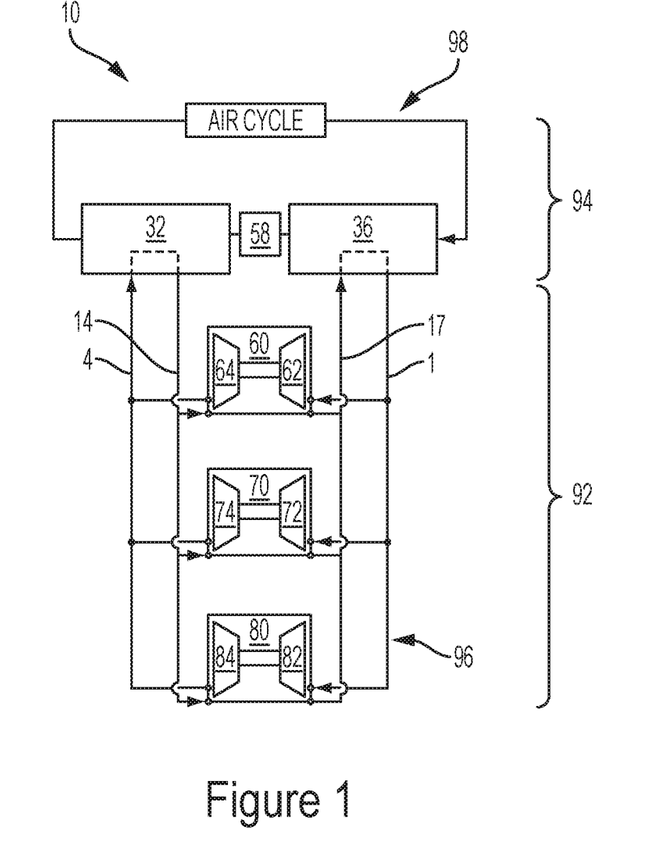
FIG. 1 is a schematic diagram of a power generation system according to an embodiment of the disclosure.

FIG. 1 is illustrates a power generation system 10 that includes a first closed Brayton cycle 92, in which the working fluid may be a supercritical fluid, and a second open Brayton cycle 94, in which the working fluid may be ambient air. The first Brayton cycle 92 and the second Brayton cycle 94 include a supercritical fluid flow path 96 and an air fluid flow path 98, respectively. The flow paths 96 and 98 are, in one embodiment, separate so that little or no mixing occurs between the supercritical fluid and air between the two flow paths 96 and 98.

The power generation system 10 includes a plurality of cores 60, 70, 80 disposed along supercritical fluid flow path 96. Each core includes a compressor 62, 72, 82, and a turbine 64, 74, 84. In addition, each core is configured to be selectively operated such that the power generation system 10 generates different levels of power depending on the number of operational cores. The power generation system 10 also includes one or more heat sources 58, and a plurality of heat exchangers connected along the flow paths 96 and 98. The heat exchangers include a plurality of cross-cycle heat exchangers 32, 36. As used herein, the term "cross cycle heat exchanger" refers to a heat exchanger that receives air or both air and combustion gas/heat from the air breathing cycle 94 as well as a supercritical fluid from the supercritical fluid cycle 92 and transfers heat between the fluids in the two cycles. The power generation system 10 may also include valves, flow meters, mixing junctions, and one or more controllers configured to control operation of the system 10.

Initially, a stream 1 of supercritical fluid is directed to the first core 60 along supercritical flow path 96. The supercritical fluid is supplied to the inlet of the first core compressor 62, which may be an axial, radial, recuperating, or the like type of compressor. The compressor 62 may be referred to as the first SCO2 compressor 62. The compressor 62 includes a shaft operably connected to a turbine 64. The turbine 64 may be referred to as the first SCO2 turbine 64. A flow meter along the stream 1 may be implemented to measure a flow rate of the supercritical fluid supplied to the first SCO2 compressor 62 inlet. The flow meter facilities control of total SCO2 mass in the supercritical fluid cycle 92 as well as transient flow behavior. In one embodiment, the supercritical fluid enters the inlet of the first SCO2 compressor 62 after it has been cooled and expanded, as discussed below, to a temperature and pressure that is close to its critical point. The term "supercritical fluid" refers to a fluid in which distinct liquid and gaseous phases do not exist, and term "critical point" of a supercritical fluid refers to the lowest temperature and pressure at which the substance can be said to be in a supercritical state. The terms "critical temperature" and "critical pressure" refer to the temperature and pressure at the critical point. For carbon dioxide, the critical point is approximately 304.2° K and 7.35 MPa. In one embodiment, the supercritical fluid entering the compressor 110 is cooled to within at least ±2° K of its critical point. In a further embodiment, the supercritical fluid entering the first SCO2 compressor 62 is cooled to within ±1° K of its critical point. In yet another embodiment, the supercritical fluid entering the first SCO2 compressor 62 is cooled to within ±0.2° K of its critical point.

After compression in the first SCO2 compressor 62, the discharge stream 4 of compressed supercritical fluid is directed to the cross cycle heat exchanger 32. In the cross cycle heat exchanger 32, heat is transferred from the air in flow path 98 to the compressed supercritical fluid. The heated supercritical fluid stream 14 is discharged from cross cycle exchanger 32.

The stream 14 of heated supercritical fluid from the cycle heat exchanger 32 is directed to the inlet of the first SCO2 turbine 64. The first SCO2 turbine 64 may be an axial, radial, mixed flow, or the like type turbine. The first SCO2 turbine 64 expands the supercritical fluid and produces shaft power that drives the first SCO2 compressor 62, via a connecting shaft. In addition, the first SCO2 turbine 64 may be operably coupled to a generator to provide a first level of output power for the system 10.

The expanded supercritical fluid is discharged from the first SCO2 turbine 64 and directed to discharge stream of expanded supercritical fluid 17. The discharge stream of expanded supercritical fluid 17 is directed to cross cycle heat exchanger 36. In cross cycle heat exchanger 36, the expanded supercritical fluid is cooled by the flow of air passing through the cross cycle heat exchanger 36 along flow path 98.

The stream of cooled supercritical fluid is discharged from the cross cycle heat exchanger 36 and directed to the inlet of the first SCO2 compressor 64 as stream 1. In an alternate embodiment, the stream of cooled supercritical fluid discharged from the cross cycle heat exchanger 36 may be directed to at least one cooler to further reduce the temperature of the supercritical fluid prior to being returned to the inlet of the first SCO2 compressor 64. Additional supercritical fluid may be introduced into stream 1 to make up for any leakage of supercritical fluid from the system. In any event, supercritical fluid stream 1 is directed to the inlet of the first SCO2 compressor 64 and the steps of compressing-heating-expanding-cooling are repeated.

In the event of an increased power demand on power generation system 10, a second core 70 along supercritical flow path 96 may be activated to generate a second level of power that is greater than the first level of power generated when only the first core 60 is operational.

To generate the second level of power, at least a portion of the stream 1 of supercritical fluid is directed to the second core 70 along supercritical flow path 96. The supercritical fluid is supplied to the inlet of the second core compressor 72, which may be referred to as the second SCO2 compressor 72.

After compression in the second SCO2 compressor 72, the discharge of compressed supercritical fluid mixes with the compressed supercritical fluid discharged from the first SCO2 compressor 62 in stream 4 of compressed supercritical fluid. After the compressed supercritical fluid is heated in the cross cycle heat exchanger 32, at least a portion of the stream 14 of heated supercritical fluid is directed to the inlet of the second SCO2 turbine 74.

The second SCO2 turbine 74 expands the supercritical fluid and produces shaft power that drives the second SCO2 compressor 72, via a connecting shaft. In addition, the second SCO2 turbine 74 may be operably coupled to a generator such that the second SCO2 turbine 74 increases the output power for the system 10 from a first level to a second level.

The expanded supercritical fluid is discharged from the second SCO2 turbine 74 and mixes with the expanded supercritical fluid discharged from the first SCO2 turbine 64 in discharge stream of expanded supercritical fluid 17. The discharge stream of expanded supercritical fluid 17 is cooled in the cross cycle heat exchanger 36 and at least a portion of the cooled supercritical fluid is directed to the inlet of the second SCO2 compressor 74 as stream 1.

In the event of a further increased power demand on power generation system 10, a third core 80 along supercritical flow path 96 may be activated to generate a third level of power that is greater than the second level of power generated when the first core 60 and the second core 70 are operational.

To generate the third level of power, at least a portion of the stream 1 of supercritical fluid is directed to the third core 80 along supercritical flow path 96. The supercritical fluid is supplied to the inlet of the third core compressor 82, which may be referred to as the third SCO2 compressor 82.

After compression in the third SCO2 compressor 82, the discharge of compressed supercritical fluid mixes with the compressed supercritical fluid discharged from the first SCO2 compressor 62 and the second SCO2 compressor 72 in stream 4 of compressed supercritical fluid. After the compressed supercritical fluid is heated in the cross cycle heat exchanger 32, at least a portion of the stream 14 of heated supercritical fluid is directed to the inlet of the third SCO2 turbine 84.

The third SCO2 turbine 84 expands the supercritical fluid and produces shaft power that drives the third SCO2 compressor 82, via a connecting shaft. In addition, the third SCO2 turbine 84 may be operably coupled to a generator such that the third SCO2 turbine 84 increases the output power for the system 10 from a second level to a third level.

The expanded supercritical fluid is discharged from the third SCO2 turbine 84 and mixes with the expanded supercritical fluid discharged from the first SCO2 turbine 64 and the second SCO2 turbine 74 in discharge stream of expanded supercritical fluid 17. The discharge stream of expanded supercritical fluid 17 is cooled in the cross cycle heat exchanger 36 and at least a portion of the cooled supercritical fluid is directed to the inlet of the third SCO2 compressor 84 as stream 1.

Continuing with FIG. 1, the air-breathing cycle 94 portion of the system 10 forms an open flow path 98. Initially, ambient air is supplied to cross cycle heat exchanger 36 along flow path 98. The air is then heated in heat source 58 and directed through cross cycle heat exchanger 32 along flow path 98. The heat source 58 can be a combustor configured to receive a stream of fuel, such as fossil fuels or other fuel type. The heat source 58 can also operate by means of a solar collector or nuclear reactor to produce system heat, or some other source of heat, including combustion of waste, biomass, or bio-derived fuels.

While only three cores were described in the above embodiment of the disclosure, the power generation system 10 is not limited to three cores. The power generation system 10 may include four cores, five cores, six cores, or additional cores to produce the required maximum power output for power generation system 10.

Figure 2:
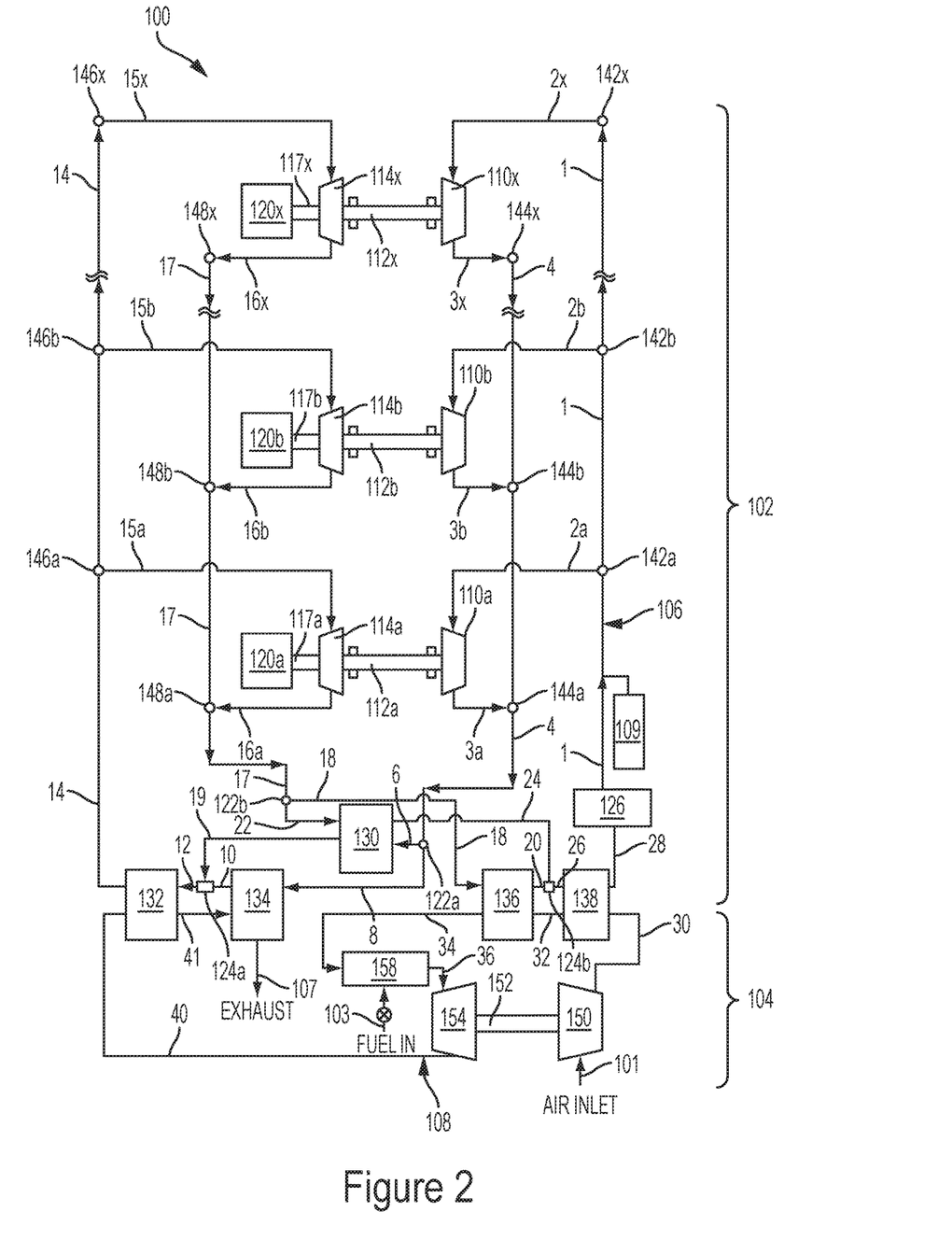
FIG. 2 is a schematic diagram of a power generation system according to another embodiment of the disclosure.

Turning to FIG. 2, which is a schematic diagram of a power generation system 100 according to another embodiment of the disclosure. The power generation system 100 is similar to power generation system 10 in that it includes a first supercritical fluid cycle 102 and a second or air-breathing cycle 104. The first and second cycles 102 and 104 include a supercritical fluid flow path 106 and an air fluid flow path 108, respectively, that are in one embodiment separate from each other such that the supercritical fluid and air do not intermix.

The power generation system 100 includes a plurality of cores disposed along supercritical fluid flow path 106. Each core includes a compressor with a shaft operably connected to a turbine. In one embodiment, the turbine also includes a shaft operably connected to an output device. In an alternative embodiment, the core contains a second turbine operably connected to an output device, wherein expanded supercritical fluid discharged from the turbine operably connected to the compressor is cycled through the second turbine, which produces shaft power for the output device. In either embodiment, the output device may provide output power for the system 100. In addition, each core may be configured to be selectively operated such that the power generation system 100 generates different levels of power depending on the number of operational cores. As described herein, the output device can be a turboprop, or turboshaft, gearbox, or generator.

As shown in FIG. 2, the first core of the plurality of cores disposed along supercritical fluid flow path 106 contains a compressor 110a operably connected to turbine 114a, via shaft 112a. Turbine 114a further includes a shaft 117a operably connected to an output device 120a that provides a first level of output power for power generation system 100. The second core of the plurality of cores disposed along supercritical fluid flow path 106 contains a compressor 110b operably connected to turbine 114b, via shaft 112b. Turbine 114b further includes a shaft 117b operably connected to an output device 120b that provides a second level of output power for power generation system 100, when the first core and second core are operational, that is greater than the first level of output power, when only the first core is operational. In designing power generation system 100, the total number of cores in the plurality of cores disposed along supercritical fluid flow path 106 is not limited to any particular number of cores.

As shown in FIG. 2, additional cores may be added based on the particular application until the desired total number of cores is reached. The total number of cores is represented in FIG. 2 by a "last core" disposed along supercritical fluid flow path 106, which contains a compressor 110x operably connected to turbine 114x, via shaft 112x. The term "last core" is used for ease of reference and refers to a condition or situation where the total number of cores, or all of the cores in the plurality of cores disposed along supercritical flow path 106, are operational. Turbine 114x further includes a shaft 117x operably connected to an output device 120x that provides an additional level of output power for power generation system 100. The total number of cores in the power generation system 100 therefore defines the number of levels of output power for the power generation system 100. Accordingly, the output power for power generation system 100 may be adjusted by selectively activating and deactivating the number of cores in operation along supercritical flow path 106 in power generation system 100.

Each core in supercritical cycle 102 may also contain a compressor input valve 142a, 142b, 142x, a compressor discharge valve 144a, 144b, 144x, a turbine input valve 146a, 146b, 146x, and a turbine output valve 148a, 148b, 148x to control the flow of supercritical fluid into and out of each core along supercritical fluid flow path 106.

The power generation system 100 further includes one or more compressors, one or more turbines, and one or more combustors disposed along the air flow path 104, and a plurality of heat exchangers disposed along the flow paths 106 and 108. The heat exchangers include a plurality of cross-cycle heat exchangers 132, 134, 136, and 138.

The power generation system 100 also includes a recuperating heat exchanger 130 along the supercritical fluid flow path 106. As used herein, the term "recuperating heat exchanger" refers to heat transfers between the expanded supercritical fluid in the turbine discharge stream 17 discharged from at least one turbine 114a, 114b, 114x in the plurality of cores, and the compressed supercritical fluid in compressor discharge stream 4 discharged from at least one compressor 110a, 110b, 110x in the plurality of cores disposed along the supercritical fluid flow path 106. The power generation system 100 also may include valves 122, flow meters (not shown), mixing junctions 124, and one or more controllers (not shown) configured to control operation of the system 100.

Initially, a stream 1 of supercritical fluid is directed to a first core along supercritical flow path 106. The supercritical fluid is supplied to the inlet of the first core compressor 110a. After compression in the compressor 110a, compressed supercritical fluid is discharged to compressor discharge stream 4. In an alternative embodiment, the stream 1 is directed to compressor input valve 142a, which directs stream 2a of supercritical fluid to the inlet of the first core compressor 110a. After compression in the compressor 110a, compressed supercritical fluid is discharged by a stream 3a to compressor discharge valve 144a, which directs the compressed supercritical fluid to compressor discharge stream 4.

The compressor discharge stream 4 may be split into first and second portions as the discharge stream 6 and discharge streams 8. The discharge stream 6 and the discharge stream 8 may be referred to as first and second discharge streams 6 and 8. Alternatively, the discharge stream 6 and the discharge stream 8 may be referred to as first and second compressor discharge streams 6 and 8. The split permits the first portion of the compressor discharge stream 4 to be recuperated and the remaining portion to be heated directly by a series of heat exchangers 134 and 132 by air fluid cycling through the flow path 108. As illustrated, the compressor discharge stream 4 is split via valve 122a which can be in electronic communication with a controller (not shown). The controller operates or actuates the valve 122a to direct flow through the flow path 106 as needed. In one embodiment, the valve 122a is configured to direct between 55% to about 75% of the compressor discharge stream 4 into the first discharge stream 6. The balance of the flow of the compressor discharge stream 4 is directed to the second discharge stream 8. In another embodiment, the valve 122a is configured to direct about 67% of the compressor discharge stream 4 into the first discharge stream 6.

The first discharge stream 6 of the supercritical fluid is directed to the recuperating heat exchanger 130 where heat is transferred from the heated supercritical fluid in second turbine discharge stream 22 to the first compressor discharge stream 6. The stream 19 of the heated supercritical fluid discharged from the recuperating heat exchanger 130 is directed to the junction 124a and mixed with the stream 10 of heated supercritical fluid that exits the cross-cycle heat exchanger 134.

The second discharge stream 8 is directed to the cross cycle heat exchanger 134. In the cross cycle heat exchanger 134, the heat from the combustion gas in flow path 108 is transferred to the second discharge stream 8 of supercritical fluid. The stream 10 discharged from heat exchanger 134 mixes with stream 19 of supercritical fluid from recuperating heat exchanger 130 at junction 124a, as discussed above. The junction 124a may be joint that is connected to conduits or it may include a mixing apparatus.

The mixed stream 12 is supplied to the cross cycle heat exchanger 132. In the cross cycle heat exchanger 132, heat is transferred from the combustion gas in the flow path 108 to the mixed stream of supercritical fluid. The cross cycle heat exchanger 132 discharges heated supercritical fluid in the turbine input stream 14.

The heated supercritical fluid in turbine input stream 14 is directed to the inlet of the first core turbine 114a. The turbine 114a expands the supercritical fluid and produces shaft power that drives the compressor 110a, via shaft 112a. The turbine 114a further drives the output device 120a to provide a first level of output power for power generation system 100. After expansion in the turbine 114a, the expanded supercritical fluid is discharged to the turbine discharge stream 17. In an alternative embodiment, the heated supercritical fluid in the turbine input stream 14 is directed to the turbine input valve 146a, which directs stream 15a of supercritical fluid to the inlet of the first core turbine 114a. The turbine 114a expands the supercritical fluid and produces shaft power that drives the compressor 110a, via shaft 112a. The turbine 114a further drives the output device 120a to provide a first level of output power for power generation system 100. After expansion in the turbine 114a, the expanded supercritical fluid is discharged by a stream 16a to turbine discharge valve 148a, which directs the supercritical fluid to the turbine discharge stream 17.

The turbine discharge stream 17 may be split into first and second portions as the discharge stream 18 and the discharge stream 22. The discharge stream 18 and the discharge stream 22 may be referred to as first and second discharge streams 18 and 22. Alternatively, the discharge stream 18 and the discharge stream 22 may be referred to as first and second turbine discharge streams 18 and 22. As illustrated, the valve 122b can spilt the turbine discharge stream 17 into the first and second discharge streams 18 and 22. The controller operates or actuates the valve 122b. In one embodiment, the valve 122b is configured to direct between 70% to about 90% of the turbine discharge stream 17 into the second discharge stream 22. The balance of the flow of the turbine discharge stream 17 is directed to the first discharge stream 18. In another embodiment, the valve 122b is configured to direct about 80% of the turbine discharge stream 17 into the second discharge stream 22. Regardless of how the turbine discharge stream 17 is spilt, the first discharge stream 18 is directed to the cross cycle heat exchanger 136 and cooled by the flow of air passing through the heat exchanger 136 along the flow path 108.

The second discharge stream 22 is directed to the recuperating heat exchanger 130, where heat from the supercritical fluid in the second turbine discharge stream 22 is transferred to the compressed supercritical fluid in the first compressor discharge stream 6. In other words, the recuperating heat exchanger 130 cools the turbine discharge stream 22 of supercritical fluid. The discharge stream 24 of the cooled supercritical fluid from the recuperating heat exchanger 130 is mixed with an incoming stream 20 from the heat exchanger 136 at a junction 124b. From the junction 124b, the mixed stream 26 is directed to the cross-cycle heat exchanger 138 (which may be optional). For instance, mixed stream 26 may be directed directly to stream 28 of cooled supercritical fluid. As noted above, in the cross-cycle heat exchanger 138, heat from the mixed stream 26 of supercritical fluid is transferred to the flow path 108 of the air cycle 104. The stream 28 of cooled supercritical fluid is directed through a cooler 126 (which may be optional) and is returned to the stream 1 of supercritical fluid. Additional supercritical fluid from a supply 109 can be introduced into the stream 1 of supercritical fluid to make up for any leakage of supercritical fluid from the system. In any event, the supercritical fluid stream 1 is returned to the inlet of the first core compressor 110a and the steps of compressing-heating-expanding-cooling are repeated.

In the event of an increased power demand on power generation system 100, a second core along supercritical flow path 106 may be activated to generate a second level of power that is greater than the first level of power generated when only the first core is operational.

To generate the second level of power, at least a portion of the stream 1 of supercritical fluid is directed to the second core along supercritical flow path 106. The supercritical fluid is supplied to the inlet of the second core compressor 110b. After compression in compressor 110b, the discharge of compressed supercritical fluid is directed to compressor discharge stream 4, where it mixes with the compressed supercritical fluid discharged from the compressor 110a. In an alternative embodiment, the at least a portion of stream 1 is directed to compressor input valve 142b, which directs stream 2b of supercritical fluid to the inlet of the second core compressor 110b. After compression in the compressor 110b, compressed supercritical fluid is discharged by a stream 3b to the compressor discharge valve 144a, which directs the compressed supercritical fluid to compressor discharge stream 4, where it mixes with the compressed supercritical fluid discharged from the compressor 110a.

The compressor discharge stream 4 is split and directed to the recuperating heat exchanger 130 and cross cycle heat exchangers 132, 134 as described above where the supercritical fluid is heated and discharged as the turbine input stream 14.

At least a portion of the heated supercritical fluid in the turbine input stream 14 is directed to the inlet of the second core turbine 114b. The turbine 114b expands the supercritical fluid and produces shaft power that drives the compressor 110b, via shaft 112b. The turbine 114b further drives the output device 120b to provide a second level of output power for power generation system 100 that is greater than the first level of power when only the first core is operational. After expansion in the turbine 114b, the expanded supercritical fluid is discharged to turbine discharge stream 17, where it mixes with the expanded supercritical fluid discharged from the turbine 114a. In an alternative embodiment, the heated supercritical fluid in turbine input stream 14 is directed to the turbine input valve 146b, which directs stream 15b of supercritical fluid to the inlet of the second core turbine 114b. The turbine 114b expands the supercritical fluid and produces shaft power that drives the compressor 110b, via shaft 112b. The turbine 114b further drives the output device 120b to provide a second level of output power for power generation system 100 that is greater than the first level of power when only the first core is operational. After expansion in the turbine 114b, the expanded supercritical fluid is discharged by a stream 16b to turbine discharge valve 148b, which directs the supercritical fluid to the turbine discharge stream 17, where it mixes with the expanded supercritical fluid discharged from the turbine 114a.

The turbine discharge stream 17 is split and directed to the recuperating heat exchanger 130 and cross cycle heat exchangers 136, 138 as described above where the expanded supercritical fluid is cooled and at least a portion of the cooled supercritical fluid in stream 1 is directed to the inlet of the second core compressor 110b.

In the event of a further increased power demand on power generation system 100, an additional core along the supercritical flow path 106 may be activated to generate an additional level of power that is greater than the second level of power generated when the first core and second core are operational. The additional levels of power are generated by flowing the supercritical fluid through the additional cores in the manner described above. The maximum level of output power for generation system 100 is produced when all of the cores disposed along the supercritical flow path 106 are operational.

To generate the maximum level of power, at least a portion of the stream 1 of supercritical fluid is directed to the last core along supercritical flow path 106. The supercritical fluid is supplied to the inlet of the last core compressor 110x. After compression in compressor 110x, the discharge of compressed supercritical fluid is directed to compressor discharge stream 4, where it mixes with the compressed supercritical fluid discharged from the compressor 110a, the compressor 110b, and the additional core compressors. In an alternative embodiment, the at least a portion of stream 1 is directed to compressor input valve 142x, which directs stream 2x of supercritical fluid to the inlet of last core compressor 110x. After compression in the compressor 110x, compressed supercritical fluid is discharged by a stream 3x to the compressor discharge valve 144x, which directs the compressed supercritical fluid to compressor discharge stream 4, where it mixes with the compressed supercritical fluid discharged from the compressor 110a, the compressor 110b, and the additional core compressors.

The compressor discharge stream 4 is split and directed to the recuperating heat exchanger 130 and cross cycle heat exchangers 132, 134 as described above where the supercritical fluid is heated and discharged as the turbine input stream 14.

At least a portion of the heated supercritical fluid in the turbine input stream 14 is directed to the inlet of the last core turbine 114x. The turbine 114x expands the supercritical fluid and produces shaft power that drives the compressor 110x, via shaft 112x. The turbine 114x further drives the output device 120x to provide the maximum level of output power for power generation system 100 when all cores are operational. After expansion in the turbine 114x, the expanded supercritical fluid is discharged to turbine discharge stream 17, where it mixes with the expanded supercritical fluid discharged from the turbine 114a, the turbine 114b, and the additional core turbines. In an alternative embodiment, the heated supercritical fluid in turbine input stream 14 is directed to the turbine input valve 146x, which directs stream 15x of supercritical fluid to the inlet of the last core turbine 114x. The turbine 114x expands the supercritical fluid and produces shaft power that drives the compressor 110x, via shaft 112x. The turbine 114x further drives the output device 120x to provide the maximum level of output power for power generation system 100 when all cores are operational. After expansion in the turbine 114x, the expanded supercritical fluid is discharged by a stream 16x to turbine discharge valve 148x, which directs the supercritical fluid to the turbine discharge stream 17, where it mixes with the expanded supercritical fluid discharged from the turbine 114a, the turbine 114b, and the additional core turbines.

The turbine discharge stream 17 is split and directed to the recuperating heat exchanger 130 and cross cycle heat exchangers 136, 138 as described above where the expanded supercritical fluid is cooled and at least a portion of the cooled supercritical fluid in stream 1 is directed to the inlet of the last core compressor 110x.

Continuing with FIG. 2, the air-breathing cycle 104 portion of the system 100 forms an open flow path 108. Initially, ambient air 101 is supplied to an air breathing compressor 150 which may be an axial, radial reciprocating, or like type compressor. The compressor 150 includes a shaft 152 operably connected to a turbine 154. The stream 30 of compressed air from the compressor 150 is then heated in the heat exchanger 138 (which may be optional) by the transfer of heat from the mixed stream 26 of supercritical fluid discharged from the heat exchangers 130 and 136 as discussed above. The stream 32 of heated compressed air is then directed to the heat exchanger 136, where heat from the supercritical fluid in the first turbine discharge stream 18 is transferred to the stream 32 of compressed air. The discharge stream 34 is the directed to the combustor 158. The combustor 158 raises the temperature of the compressed air stream 34 above the required temperature at the turbine inlet of turbine 154. The compressor 150 can operate via shaft 152 powered by turbine 154. The combustor 158 can receive a stream of fuel 103, such as fossil fuels or other fuel type. The combustor 158 can operate by means of a solar collector or nuclear reactor to produce system heat or some may other heat source of heat including combustion of waste, biomass, or bio-derived fuels. The discharge stream 36 of the combustion gas from the combustor 158 may be directed to the turbine 154, where it is expanded. The stream 40 of expanded hot combustion gas is directed to the heat exchanger 132, where heat is transferred from the hot combustion gas to the mixed stream 12 of supercritical fluid discussed above. After exiting the heat exchanger 132, the stream 41 of hot combustion gas is directed to the heat exchanger 134, where heat is transferred from the hot combustion gas to the compressed supercritical fluid in the second compressor discharge stream 8, as discussed above. The discharge stream 107 of the heat exchanger 134 may be exhausted into atmosphere.

Figure 3:
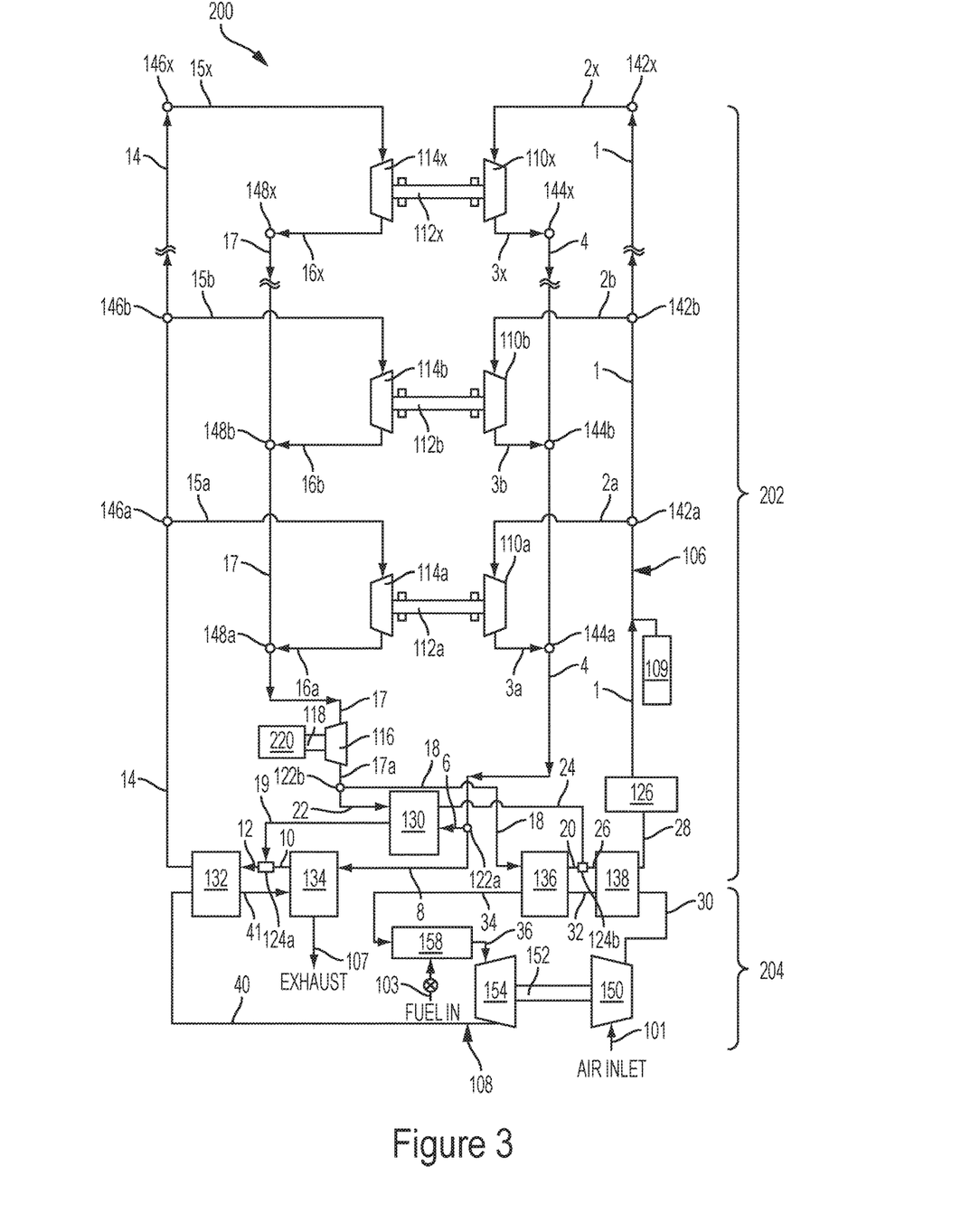
FIG. 3 is a schematic diagram of a power generation system according to another embodiment of the disclosure.

Turning to FIG. 3, which is a schematic diagram of a power generation system 200 according to another embodiment of the disclosure. The power generation system 200 is nearly identical to power generation system 100, accordingly, like element numbers will be used to identify like components. One difference in power generation system 200 is that each core in power generation system 200 does not have an output device. Rather, the power generation system 200 includes a power turbine 116 operably connected to output device 220, via shaft 118, wherein the expanded supercritical fluid discharged from the turbine in each core is cycled through the power turbine 116, which produces shaft power for the output device 220. After expansion in the power turbine 116 the expanded supercritical fluid is discharged toward the recuperating heat exchanger and a plurality of cross cycle heat exchangers.

The power generation system 200 includes a first supercritical fluid cycle 202 and a second or air-breathing cycle 204. The first and second cycles 202 and 204 include a supercritical fluid flow path 106 and an air fluid flow path 108, respectively, that are in one embodiment separate from each other such that the supercritical fluid and air do not intermix.

The power generation system 200 includes a plurality of cores disposed along supercritical fluid flow path 106. Each core includes a compressor with a shaft operably connected to a turbine. In addition, each core may be configured to be selectively operated such that the power generation system 200 generates different levels of power depending on the number of operational cores.

As shown in FIG. 3, the first core of the plurality of cores disposed along supercritical fluid flow path 106 contains a compressor 110a operably connected to turbine 114a, via shaft 112a. The first core turbine 114a provides a first level of output power in the output device 220 for power generation system 200. The output device 220 may be a turboprop, or turboshaft, gearbox, or generator. The second core of the plurality of cores disposed along supercritical fluid flow path 106 contains a compressor 110b operably connected to turbine 114b, via shaft 112b. The second core turbine 114b provides a second level of output power in the output device 220 for power generation system 200, when the first core and second core are operational, that is greater than the first level of output power, when only the first core is operational. In designing power generation system 200, the total number of cores in the plurality of cores disposed along supercritical fluid flow path 106 is not limited to any particular number of cores. As shown in FIG. 3, additional cores may be added based on the particular application until the desired total number of cores is reached. The total number of cores is represented in FIG. 3 by the last core disposed along supercritical fluid flow path 106, which contains a compressor 110x operably connected to turbine 114x, via shaft 112x. The last core turbine 114x provides a maximum level of output power in the output device 220 for power generation system 200 when all cores are operational. The total number of cores in the power generation system 200 therefore defines the number of levels of output power for the power generation system 200. Accordingly, the output power for power generation system 200 may be dynamically adjusted by selectively activating and/or deactivating the number of operational cores from the first core to the total number of cores/last core disposed along supercritical flow path 106 in power generation system 200.

Each core in supercritical cycle 202 may also contain a compressor input valve 142*a*, 142*b*, 142*x*; a compressor discharge valve 144*a*, 144*b*, 144*x*; a turbine input valve 146*a*, 146*b*, 146*x*; and a turbine output valve 148*a*, 148*b*, 148*x* to control the flow of supercritical fluid into and out of each core along supercritical fluid flow path 106.

The power generation system 200 further includes one or more compressors, one or more turbines, and one or more combustors disposed along the air flow path 204, and a plurality of heat exchangers disposed along the flow paths 106 and 108. The heat exchangers include a plurality of cross-cycle heat exchangers 132, 134, 136, and 138.

The power generation system 200 also includes a recuperating heat exchanger 130 along the supercritical fluid flow path 106. The power generation system 200 also may include valves 122, flow meters (not shown), mixing junctions 124, and one or more controllers (not shown) configured to control operation of the system 200.

Initially, a stream 1 of supercritical fluid is directed to a first core along supercritical flow path 106. The supercritical fluid is supplied to the inlet of the first core compressor 110*a*. After compression in the compressor 110*a*, compressed supercritical fluid is discharged to compressor discharge stream 4. In an alternative embodiment, the stream 1 is directed to compressor input valve 142*a*, which directs stream 2*a* of supercritical fluid to the inlet of the first core compressor 110*a*. After compression in the compressor 110*a*, compressed supercritical fluid is discharged by a stream 3*a* to compressor discharge valve 144*a*, which directs the compressed supercritical fluid to compressor discharge stream 4.

The compressor discharge stream 4 may be split into first and second portions as the discharge stream 6 and discharge streams 8. The discharge stream 6 and the discharge stream 8 may be referred to as first and second discharge streams 6 and 8. Alternatively, the discharge stream 6 and the discharge stream 8 may be referred to as first and second compressor discharge streams 6 and 8. The split permits the first portion of the compressor discharge stream 4 to be recuperated and the remaining portion to be heated directly by a series of heat exchangers 134 and 132 by air fluid cycling through the flow path 108. As illustrated, the compressor discharge stream 4 is split via valve 122*a* which can be in electronic communication with a controller (not shown). The controller operates or actuates the valve 122*a* to direct flow through the flow path 106 as needed. In one embodiment, the valve 122*a* is configured to direct between 55% to about 75% of the compressor discharge stream 4 into the first discharge stream 6. The balance of the flow of the compressor discharge stream 4 is directed to the second discharge stream 8. In another embodiment, the valve 122*a* is configured to direct about 67% of the compressor discharge stream 4 into the first discharge stream 6.

The first discharge stream 6 of the supercritical fluid is directed to the recuperating heat exchanger 130 where heat is transferred from the heated supercritical fluid in second turbine discharge stream 22 to the first compressor discharge stream 6. The stream 19 of the heated supercritical fluid discharged from the recuperating heat exchanger 130 is directed to the junction 124*a* and mixed with the stream 10 of heated supercritical fluid that exits the cross-cycle heat exchanger 134.

The second discharge stream 8 is directed to the cross cycle heat exchanger 134. In the cross cycle heat exchanger 134, the heat from the combustion gas in flow path 108 is transferred to the second discharge stream 8 of supercritical fluid. The stream 10 discharged from heat exchanger 134 mixes with stream 19 of supercritical fluid from recuperating heat exchanger 130 at junction 124*a*, as discussed above. The junction 124*a* may be joint that is connected to conduits or it may include a mixing apparatus.

The mixed stream 12 is supplied to the cross cycle heat exchanger 132. In the cross cycle heat exchanger 132, heat is transferred from the combustion gas in the flow path 108 to the mixed stream of supercritical fluid. The cross cycle heat exchanger 132 discharges heated supercritical fluid in the turbine input stream 14.

The heated supercritical fluid in turbine input stream 14 is directed to the inlet of the first core turbine 114*a*. The turbine 114*a* expands the supercritical fluid and produces shaft power that drives the compressor 110*a*, via shaft 112*a*. After expansion in the turbine 114*a*, the expanded supercritical fluid is discharged to the turbine discharge stream 17. In an alternative embodiment, the heated supercritical fluid in the turbine input stream 14 is directed to the turbine input valve 146*a*, which directs stream 15*a* of supercritical fluid to the inlet of the first core turbine 114*a*. The turbine 114*a* expands the supercritical fluid and produces shaft power that drives the compressor 110*a*, via shaft 112*a*. After expansion in the turbine 114*a*, the expanded supercritical fluid is discharged by a stream 16*a* to turbine discharge valve 148*a*, which directs the supercritical fluid to the turbine discharge stream 17.

The turbine discharge stream 17 is directed to the inlet of power turbine 116 where it is expanded to produce shaft power that drives the output device 220, via shaft 118, to provide a first level of output power for power generation system 200. After expansion in the power turbine 116, the expanded supercritical fluid is directed to turbine discharge stream 17*a*.

The turbine discharge stream 17*a* may be split into first and second portions as the discharge stream 18 and the discharge stream 22. The discharge stream 18 and the discharge stream 22 may be referred to as first and second discharge streams 18 and 22. Alternatively, the discharge stream 18 and the discharge stream 22 may be referred to as first and second turbine discharge streams 18 and 22. As illustrated, the valve 122*b* can spilt the turbine discharge stream 17*a* into the first and second discharge streams 18 and 22. The controller operates or actuates the valve 122*b*. In one embodiment, the valve 122*b* is configured to direct between 70% to about 90% of the turbine discharge stream 17*a* into the second discharge stream 22. The balance of the flow of the turbine discharge stream 17*a* is directed to the first discharge stream 18. In another embodiment, the valve 122*b* is configured to direct about 80% of the turbine discharge stream 17*a* into the second discharge stream 22. Regardless of how the turbine discharge stream 17*a* is spilt, the first discharge stream 18 is directed to the cross cycle heat exchanger 136 and cooled by the flow of air passing through the heat exchanger 136 along the flow path 108.

The second discharge stream 22 is directed to the recuperating heat exchanger 130, where heat from the supercritical fluid in the second turbine discharge stream 22 is transferred to the compressed supercritical fluid in the first compressor discharge stream 6. In other words, the recuperating heat exchanger 130 cools the turbine discharge stream 22 of supercritical fluid. The discharge stream 24 of the cooled supercritical fluid from the recuperating heat exchanger 130 is mixed with an incoming stream 20 from the heat exchanger 136 at a junction 124*b*. From the junction 124*b*, the mixed stream 26 is directed to the cross-cycle heat exchanger 138 (which may be optional). For instance, mixed stream 26 may be directed directly to stream 28 of cooled supercritical fluid. As noted above, in the cross-cycle heat exchanger 138, heat from the mixed stream 26 of supercritical fluid is transferred to the flow path 108 of the air cycle 204. The stream 28 of cooled supercritical fluid is directed through a cooler 126 (which may be optional) and is returned to the stream 1 of supercritical fluid. Additional supercritical fluid from a supply 109 can be introduced into the stream 1 of supercritical fluid to make up for any leakage of supercritical fluid from the system. In any event, the supercritical fluid stream 1 is returned to the inlet of the first core compressor 110a and the steps of compressing-heating-expanding-cooling are repeated.

In the event of an increased power demand on power generation system 200, a second core along supercritical flow path 106 may be activated to generate a second level of power in an output device 220 that is greater than the first level of power generated when only the first core is operational.

To generate the second level of power, at least a portion of the stream 1 of supercritical fluid is directed to the second core along supercritical flow path 106. The supercritical fluid is supplied to the inlet of the second core compressor 110b. After compression in compressor 110b, the discharge of compressed supercritical fluid is directed to compressor discharge stream 4, where it mixes with the compressed supercritical fluid discharged from the compressor 110a. In an alternative embodiment, the at least a portion of stream 1 is directed to compressor input valve 142b, which directs stream 2b of supercritical fluid to the inlet of the second core compressor 110b. After compression in the compressor 110b, compressed supercritical fluid is discharged by a stream 3b to the compressor discharge valve 144a, which directs the compressed supercritical fluid to compressor discharge stream 4, where it mixes with the compressed supercritical fluid discharged from the compressor 110a.

The compressor discharge stream 4 is split and directed to the recuperating heat exchanger 130 and cross cycle heat exchangers 132, 134 as described above where the supercritical fluid is heated and discharged as the turbine input stream 14.

At least a portion of the heated supercritical fluid in the turbine input stream 14 is directed to the inlet of the second core turbine 114b. The turbine 114b expands the supercritical fluid and produces shaft power that drives the compressor 110b, via shaft 112b. After expansion in the turbine 114b, the expanded supercritical fluid is discharged to turbine discharge stream 17, where it mixes with the expanded supercritical fluid discharged from the turbine 114a. In an alternative embodiment, the heated supercritical fluid in turbine input stream 14 is directed to the turbine input valve 146b, which directs stream 15b of supercritical fluid to the inlet of the second core turbine 114b. The turbine 114b expands the supercritical fluid and produces shaft power that drives the compressor 110b, via shaft 112b. After expansion in the turbine 114b, the expanded supercritical fluid is discharged by a stream 16b to turbine discharge valve 148b, which directs the supercritical fluid to the turbine discharge stream 17, where it mixes with the expanded supercritical fluid discharged from the turbine 114a.

The turbine discharge stream 17 is directed to the inlet of power turbine 116 where it is expanded to produce shaft power that drives the output device 220, via shaft 118, to provide a second level of output power for power generation system 200 that is greater than the first level of power when only the first core is operational. After expansion in the power turbine 116, the expanded supercritical fluid is directed to turbine discharge stream 17a.

The turbine discharge stream 17a is split and directed to the recuperating heat exchanger 130 and cross cycle heat exchangers 136, 138 as described above where the expanded supercritical fluid is cooled and at least a portion of the cooled supercritical fluid in stream 1 is directed to the inlet of the second core compressor 110b.

In the event of a further increased power demand on power generation system 200, an additional core along the supercritical flow path 106 may be activated to generate an additional level of power that is greater than the second level of power generated when the first core and second core are operational. The additional levels of power are generated by flowing the supercritical fluid through the additional cores in the manner described above. The maximum level of output power for generation system 200 is produced when all of the cores disposed along the supercritical flow path 106 are operational.

To generate the maximum level of power, at least a portion of the stream 1 of supercritical fluid is directed to the last core along supercritical flow path 106. The supercritical fluid is supplied to the inlet of the last core compressor 110x. After compression in compressor 110x, the discharge of compressed supercritical fluid is directed to compressor discharge stream 4, where it mixes with the compressed supercritical fluid discharged from the compressor 110a, the compressor 110b, and the additional core compressors. In an alternative embodiment, the at least a portion of stream 1 is directed to compressor input valve 142x, which directs stream 2x of supercritical fluid to the inlet of last core compressor 110x. After compression in the compressor 110x, compressed supercritical fluid is discharged by a stream 3x to the compressor discharge valve 144x, which directs the compressed supercritical fluid to compressor discharge stream 4, where it mixes with the compressed supercritical fluid discharged from the compressor 110a, the compressor 110b, and the additional core compressors.

The compressor discharge stream 4 is split and directed to the recuperating heat exchanger 130 and cross cycle heat exchangers 132, 134 as described above where the supercritical fluid is heated and discharged as the turbine input stream 14.

At least a portion of the heated supercritical fluid in the turbine input stream 14 is directed to the inlet of the last core turbine 114x. The turbine 114x expands the supercritical fluid and produces shaft power that drives the compressor 110x, via shaft 112x. After expansion in the turbine 114x, the expanded supercritical fluid is discharged to turbine discharge stream 17, where it mixes with the expanded supercritical fluid discharged from the turbine 114a, the turbine 114b, and the additional core turbines. In an alternative embodiment, the heated supercritical fluid in turbine input stream 14 is directed to the turbine input valve 146x, which directs stream 15x of supercritical fluid to the inlet of the last core turbine 114x. The turbine 114x expands the supercritical fluid and produces shaft power that drives the compressor 110x, via shaft 112x. After expansion in the turbine 114x, the expanded supercritical fluid is discharged by a stream 16x to turbine discharge valve 148x, which directs the supercritical fluid to the turbine discharge stream 17, where it mixes with the expanded supercritical fluid discharged from the turbine 114a, there turbine 114b, and the additional core turbines.

The turbine discharge stream 17 is directed to the inlet of power turbine 116 where it is expanded to produce shaft power that drives the output device 220, via shaft 118, to provide the maximum level of output power for power generation system 200 when all cores are operational. After expansion in the power turbine 116, the expanded supercritical fluid is directed to turbine discharge stream 17a.

The turbine discharge stream 17a is split and directed to the recuperating heat exchanger 130 and cross cycle heat exchangers 136, 138 as described above where the expanded supercritical fluid is cooled and at least a portion of the cooled supercritical fluid in stream 1 is directed to the inlet of the last core compressor 110x.

Continuing with FIG. 3, the air-breathing cycle 204 portion of the system 200 is identical in operation and configuration with the air-breathing cycle 104 portion of the overall power generation system 100 described above.

Figure 4:
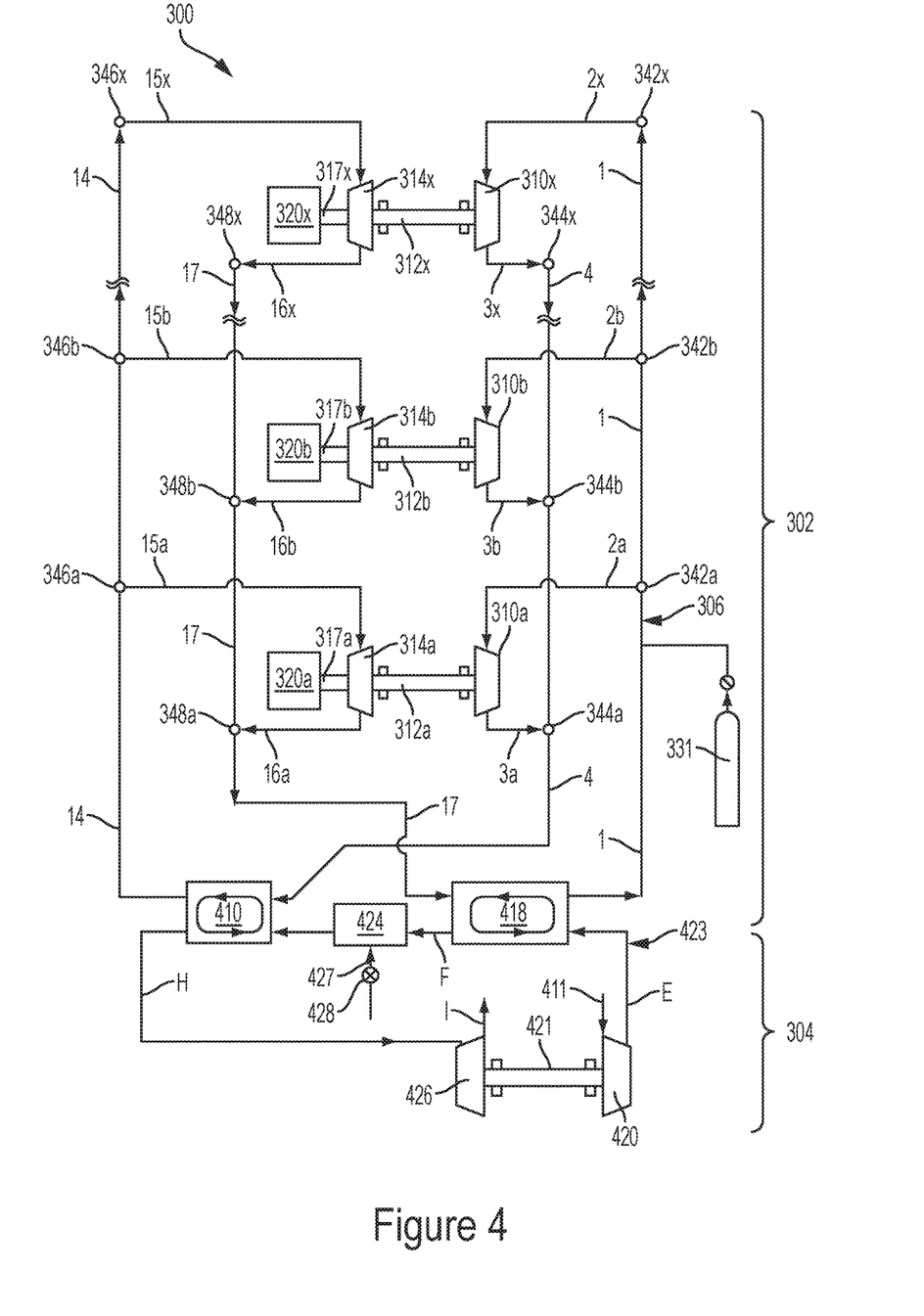
FIG. 4 is a schematic diagram of a power generation system according to another embodiment of the disclosure.

Referring to FIG. 4, which is a schematic diagram of a power generation system 300 according to another embodiment of the disclosure. The power generation system 300 is similar to power generation system 100 in that it includes a first supercritical fluid cycle 302 and a second or air-breathing cycle 304. The first and second cycles 302 and 304 include a supercritical fluid flow path 306 and an air fluid flow path 423, respectively, that are in one embodiment separate from each other such that the supercritical fluid and air do not intermix. Unlike power generation system 100, however, power generation system 300 does not incorporate a recuperating heat exchanger in the supercritical fluid cycle 302.

The power generation system 300 includes a plurality of cores disposed along supercritical fluid flow path 306. Each core includes a compressor with a shaft operably connected to a turbine. In one embodiment, the turbine also includes a shaft operably connected to an output device. In an alternative embodiment, the core contains a second turbine operably connected to an output device, wherein expanded supercritical fluid discharged from the turbine operably connected to the compressor is cycled through the second turbine, which produces shaft power for the output device. In either embodiment, the output device may provide output power for the system 300. In addition, each core may be configured to be selectively operated such that the power generation system 300 generates different levels of power depending on the number of operational cores. As discussed herein, the output device may be a turboprop, turbofan, gearbox, or generator.

As shown in FIG. 4, the first core of the plurality of cores disposed along supercritical fluid flow path 306 contains a compressor 310a operably connected to turbine 314a, via shaft 312a. Turbine 314a further includes a shaft 317a operably connected to an output device 320a that provides a first level of output power for power generation system 300. The second core of the plurality of cores disposed along supercritical fluid flow path 306 contains a compressor 310b operably connected to turbine 314b, via shaft 312b. Turbine 314b further includes a shaft 317b operably connected to an output device 320b that provides a second level of output power for power generation system 300, when the first core and second core are operational, that is greater than the first level of output power, when only the first core is operational. In designing power generation system 300, the total number of cores in the plurality of cores disposed along supercritical fluid flow path 306 is not limited to any particular number of cores.

As shown in FIG. 4, additional cores may be added based on the particular application until the desired total number of cores is reached. The total number of cores is represented in FIG. 4 by the last core disposed along supercritical fluid flow path 306, which contains a compressor 310x operably connected to turbine 314x, via shaft 312x. Turbine 314x further includes a shaft 317x operably connected to an output device 320x that provides a maximum level of output power for power generation system 300 when all cores are operational. The total number of cores in the power generation system 300 therefore defines the number of levels of output power for the power generation system 300. Accordingly, the output power for power generation system 300 may be dynamically adjusted by selectively activating and/or deactivating the number of operational cores from the first core to the total number of cores/last core disposed along supercritical flow path 306 in power generation system 300.

Each core in supercritical cycle 302 may also contain a compressor input valve 342a, 342b, 342x; a compressor discharge valve 344a, 344b, 344x; a turbine input valve 346a, 346b, 346x; and a turbine output valve 348a, 348b, 348x to control the flow of supercritical fluid into and out of each core along supercritical fluid flow path 306.

The power generation system 300 further includes one or more compressors, one or more turbines, and one or more combustors disposed along the air flow path 423, and a plurality of heat exchangers disposed along the flow paths 306 and 423. The heat exchangers include a plurality of cross-cycle heat exchangers 410 and 418.

Initially, a stream 1 of supercritical fluid is directed to a first core along supercritical flow path 306. The supercritical fluid is supplied to the inlet of the first core compressor 310a. After compression in the compressor 310a, compressed supercritical fluid is discharged to compressor discharge stream 4. In an alternative embodiment, the stream 1 is directed to compressor input valve 342a, which directs stream 2a of supercritical fluid to the inlet of the first core compressor 310a. After compression in the compressor 310a, compressed supercritical fluid is discharged by a stream 3a to compressor discharge valve 344a, which directs the compressed supercritical fluid to compressor discharge stream 4.

The compressor discharge stream 4 is heated in a cross cycle heat exchanger 410, which is connected to the supercritical flow path 306 and air breathing flow path 423. The cross cycle heat exchanger for discharges heated supercritical fluid in the turbine input stream 14.

The heated supercritical fluid in turbine input stream 14 is directed to the inlet of the first core turbine 314a. The turbine 314a expands the supercritical fluid and produces shaft power that drives the compressor 310a, via shaft 312a. The turbine 314a further drives the output device 320a to provide a first level of output power for power generation system 300. After expansion in the turbine 314a, the expanded supercritical fluid is discharged to the turbine discharge stream 17. In an alternative embodiment, the heated supercritical fluid in the turbine input stream 14 is directed to the turbine input valve 346a, which directs stream 15a of supercritical fluid to the inlet of the first core turbine 314a. The turbine 314a expands the supercritical fluid and produces shaft power that drives the compressor 310a, via shaft 312a. The turbine 314a further drives the output device 320a to provide a first level of output power for power generation system 300. After expansion in the turbine 314a, the expanded supercritical fluid is discharged by a stream 16a to turbine discharge valve 348a, which directs the supercritical fluid to the turbine discharge stream 17.

The turbine discharge stream 17 is directed to the cross cycle heat exchanger 418 where the expanded supercritical fluid is cooled by the flow of air passing through the heat exchanger 418 along the air-breathing flow path 423.

The stream of cooled supercritical fluid may be directed through a cooler (not shown) (which may be optional) and is returned to the stream 1 of supercritical fluid. Additional supercritical fluid from a supply 331 can be introduced into the stream 1 of supercritical fluid to make up for any leakage of supercritical fluid from the system. In any event, the supercritical fluid stream 1 is returned to the inlet of the first core compressor 310*a* and the steps of compressing-heating-expanding-cooling are repeated.

In the event of an increased power demand on power generation system 300, a second core along supercritical flow path 306 may be activated to generate a second level of power that is greater than the first level of power generated when only the first core is operational.

To generate the second level of power, at least a portion of the stream 1 of supercritical fluid is directed to the second core along supercritical flow path 306. The supercritical fluid is supplied to the inlet of the second core compressor 310*b*. After compression in compressor 310*b*, the discharge of compressed supercritical fluid is directed to compressor discharge stream 4, where it mixes with the compressed supercritical fluid discharged from the compressor 310*a*. In an alternative embodiment, the at least a portion of stream 1 is directed to compressor input valve 342*b*, which directs stream 2*b* of supercritical fluid to the inlet of the second core compressor 310*b*. After compression in the compressor 310*b*, compressed supercritical fluid is discharged by a stream 3*b* to the compressor discharge valve 344*a*, which directs the compressed supercritical fluid to compressor discharge stream 4, where it mixes with the compressed supercritical fluid discharged from the compressor 310*a*.

The compressor discharge stream 4 is directed to the cross cycle heat exchanger 410 as described above where the supercritical fluid is heated and discharged as the turbine input stream 14.

At least a portion of the heated supercritical fluid in the turbine input stream 14 is directed to the inlet of the second core turbine 314*b*. The turbine 314 *b* expands the supercritical fluid and produces shaft power that drives the compressor 310*b*, via shaft 312*b*. The turbine 314*b* further drives the output device 320*b* to provide a second level of output power for power generation system 300 that is greater than the first level of power when only the first core is operational. After expansion in the turbine 314*b*, the expanded supercritical fluid is discharged to turbine discharge stream 17, where it mixes with the expanded supercritical fluid discharged from the turbine 314*a*. In an alternative embodiment, the heated supercritical fluid in turbine input stream 14 is directed to the turbine input valve 346*b*, which directs stream 15*b* of supercritical fluid to the inlet of the second core turbine 314*b*. The turbine 314*b* expands the supercritical fluid and produces shaft power that drives the compressor 310*b*, via shaft 312*b*. The turbine 314*b* further drives the output device 320*b* to provide a second level of output power for power generation system 300 that is greater than the first level of power when only the first core is operational. After expansion in the turbine 314*b*, the expanded supercritical fluid is discharged by a stream 16*b* to turbine discharge valve 348*b*, which directs the supercritical fluid to the turbine discharge stream 17, where it mixes with the expanded supercritical fluid discharged from the turbine 314*a*.

The turbine discharge stream 17 is directed to the cross cycle heat exchanger 418 as described above where the expanded supercritical fluid is cooled and at least a portion of the cooled supercritical fluid in stream 1 is directed to the inlet of the second core compressor 310*b*.

In the event of a further increased power demand on power generation system 300, an additional core along the supercritical flow path 306 may be activated to generate an additional level of power that is greater than the second level of power generated when the first core and second core are operational. The additional levels of power are generated by flowing the supercritical fluid through the additional cores in the manner described above. The maximum level of output power for generation system 300 is produced when all of the cores disposed along the supercritical flow path 306 are operational.

To generate the maximum level of power, at least a portion of the stream 1 of supercritical fluid is directed to the last core along supercritical flow path 306. The supercritical fluid is supplied to the inlet of the last core compressor 310*x*. After compression in compressor 310*x*, the discharge of compressed supercritical fluid is directed to compressor discharge stream 4, where it mixes with the compressed supercritical fluid discharged from the compressor 310*a*, the compressor 310*b*, and the additional core compressors. In an alternative embodiment, the at least a portion of stream 1 is directed to compressor input valve 342*x*, which directs stream 2*x* of supercritical fluid to the inlet of last core compressor 310*x*. After compression in the compressor 310*x*, compressed supercritical fluid is discharged by a stream 3*x* to the compressor discharge valve 344*x*, which directs the compressed supercritical fluid to compressor discharge stream 4, where it mixes with the compressed supercritical fluid discharged from the compressor 310*a*, the compressor 310*b*, and the additional core compressors.

The compressor discharge stream 4 is directed to the cross cycle heat exchanger 410 as described above where the supercritical fluid is heated and discharged as the turbine input stream 14.

At least a portion of the heated supercritical fluid in the turbine input stream 14 is directed to the inlet of the last core turbine 314*x*. The turbine 314*x* expands the supercritical fluid and produces shaft power that drives the compressor 310*x*, via shaft 312*x*. The turbine 314*x* further drives the output device 320*x* to provide the maximum level of output power for power generation system 300 when all cores are operational. After expansion in the turbine 314*x*, the expanded supercritical fluid is discharged to turbine discharge stream 17, where it mixes with the expanded supercritical fluid discharged from the turbine 314*a*, the turbine 314*b*, and the additional core turbines. In an alternative embodiment, the heated supercritical fluid in turbine input stream 14 is directed to the turbine input valve 346*x*, which directs stream 15*x* of supercritical fluid to the inlet of the last core turbine 314*x*. The turbine 314*x* expands the supercritical fluid and produces shaft power that drives the compressor 310*x*, via shaft 312*x*. The turbine 314*x* further drives the output device 320*x* to provide the maximum level of output power for power generation system 300 when all cores are operational. After expansion in the turbine 314*x*, the expanded supercritical fluid is discharged by a stream 16*x* to turbine discharge valve 348*x*, which directs the supercritical fluid to the turbine discharge stream 17, where it mixes with the expanded supercritical fluid discharged from the turbine 314*a*, the turbine 314*b*, and the additional core turbines.

The turbine discharge stream 17 is directed to the cross cycle heat exchanger 418 as described above where the expanded supercritical fluid is cooled and at least a portion of the cooled supercritical fluid in stream 1 is directed to the inlet of the last core compressor 310*x*.

In the air-breathing cycle 304, initially, ambient air 411 is supplied to a compressor 420. The stream E of compressed air from the compressor 420 is then heated in the heat exchanger 418 by the transfer of heat from the supercritical fluid in turbine output stream 17. The stream F of heated compressed air is then directed to a combustor 424. The combustor 424 receives a stream 427 of fuel, such as jet fuel, diesel fuel, natural gas, or bio-fuel, is introduced by a fuel controller 428 and combusted in the air so as to produce hot combustion gas. The stream G of the combustion gas from the combustor 424 is directed to the heat exchanger 410 where heat is transferred to the compressed supercritical fluid in the compressor discharge stream 4, as discussed above. After exiting the heat exchanger 410, the stream H of combustion gas is expanded in a turbine 426, which produces power to drive the air compressor 420, via shaft 421. After expansion in the turbine 426, the combustion gas I is exhausted to atmosphere.

Figure 5:
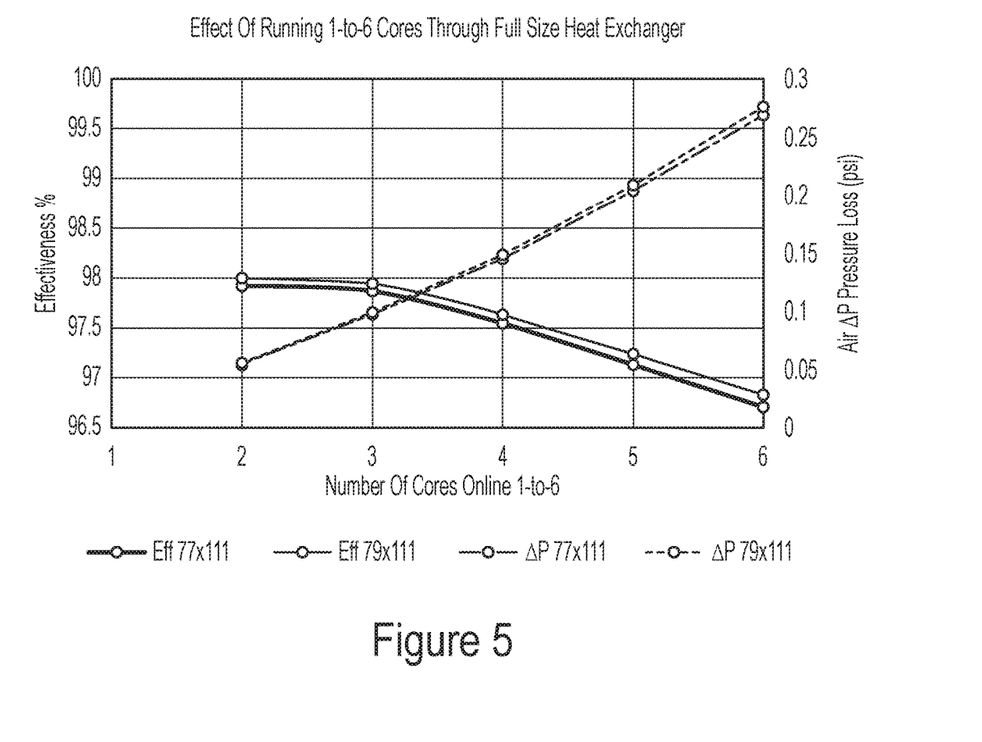
FIG. 5 is a chart illustrating heat exchanger effectiveness relative to the number of operational cores.

Referring to FIG. 5, it is a chart that plots the effectiveness of a heat exchanger in a system containing six cores, where the heat exchanger is designed for peak performance when one core is operational (15-20% power demand). As shown in FIG. 5, the heat exchanger only experiences a minimal degradation in efficiency (approximately 3%) when all six cores in the system are operational. Accordingly, this allows for an economical heat exchanger design, without sacrificing significant performance when the power generation system is operating at maximum capacity. As such, power generation systems that normally operate under partial power have the potential for a reduction in fuel consumption at normal operating conditions, without sacrificing maximum power output.

In another embodiment of the present disclosure, the cross cycle heat exchangers 132, 134, 136, and 138 are designed for peak performance when only one core of the plurality of cores disposed along the supercritical fluid cycle is operational.

In another embodiment, the recuperating heat exchanger 130 is designed for peak performance when only one core of the plurality of cores disposed along the supercritical fluid cycle is operational.

In another alternative embodiment, the power generation system 100, 200, 300 as described herein includes a supercritical fluid turbine assembly that includes an eddy current torque coupling as disclosed in the 259 publication. The disclosure of the eddy current torque coupling in the 259 publication is incorporated by reference into this application in its entirety.

Applications for the power generation systems 100, 200, 300 include but are not limited to aircraft engines (such as turbo-fan, turbo-prop, or turbo-shaft engines), ground based electric power generators, naval propulsion systems, ground transportation engines, etc. In addition, the power generation systems 100, 200, 300 may be used for Directed Energy Weapons (DEW) power generation. Furthermore, other applications can include power and heat generation, such as steam and hot water. The systems can be used for any other application where shaft power is required.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

What is claimed:

1. A method for generating power in a system that includes a supercritical fluid cycle having a supercritical fluid flowing therethrough, and an air-breathing cycle having air flowing therethrough that does not mix with the flow of the supercritical fluid, the method comprising the steps of:
    directing the supercritical fluid through a first core of a plurality of cores disposed along the supercritical fluid cycle, each core including a compressor and a turbine;
    compressing the supercritical fluid in the compressor of the first core such that the supercritical fluid is discharged from the compressor of the first core as a compressed supercritical fluid;
    transferring heat to the compressed supercritical fluid from the air in the air-breathing cycle in at least one heat exchanger such that the compressed supercritical fluid is discharged from the at least one heat exchanger as a heated supercritical fluid;
    directing at least a portion of the heated supercritical fluid from the at least one heat exchanger to the turbine of the first core;
    expanding the heated supercritical fluid in the turbine of the first core such that the first core generates a first level of power in an output device; and
    activating at least a second core of the plurality of cores such that the second core increases the first level power generated in the output device to a second level of power that is greater than the first level of power,
    wherein the activating further includes causing the supercritical fluid to flow to a compressor of the second core, the at least one heat exchanger, and a turbine of the second core, such that the turbine of the second core increases the first level of power in the output device to the second level of power.

2. The method of claim 1, wherein the activating step is in response to a power demand on the system.

3. The method of claim 1, wherein the causing step further includes:
    directing supercritical fluid to the compressor of the second core of the plurality of cores along the supercritical fluid cycle;
    compressing the supercritical fluid in the compressor of the second core such that the supercritical fluid is discharged from the compressor of the second core as a compressed supercritical fluid;
    mixing the compressed supercritical fluid discharged from the compressor of the second core with the compressed supercritical fluid discharged from the compressor of the first core to define a mixture of supercritical fluid;
    directing at least a portion of the mixture of the supercritical fluid to the turbine of the second core;
    expanding the at least a portion of the mixture of the supercritical fluid in the turbine of the second core such that the second core increases the first level of power of the output device to the second level of power.

4. The method of claim 1, wherein the activating step further includes causing the supercritical fluid to flow through a compressor of a third core, the at least one heat exchanger, and a turbine of the third core, such that the turbine of the third core increases the second level of power in the output device to a third level of power.

5. The method of claim 4, wherein the causing step further includes:
   directing supercritical fluid to the compressor of the third core of the plurality of cores along the supercritical fluid cycle;
   compressing the supercritical fluid in the compressor of the third core such that the supercritical fluid is discharged from the compressor of the third core as a compressed supercritical fluid;
   mixing the compressed supercritical fluid discharged from the compressor of the third core with the mixture of supercritical fluid;
   directing at least a portion of the mixture of the supercritical fluid to the turbine of the third core; and
   expanding the at least a portion of the mixture of the supercritical fluid in the turbine of the third core such that the third core increases the second level of power of the output device to the third level of power.

6. The method of claim 1, wherein the supercritical fluid comprises carbon dioxide.

7. The method of claim 1, wherein sufficient heat is transferred from the expanded supercritical fluid to cool the mixture of expanded supercritical fluid to approximately the critical point of the supercritical fluid.

8. The method of claim 1, wherein the activating step further includes causing the supercritical fluid to flow through a compressor of at least one additional core of the plurality of cores, the at least one heat exchanger, and a turbine of at least one additional core of the plurality of cores, such that the turbine of the at least one additional core increases the second level of power in the output device to a level of power equal to the total number of activated cores.

9. The method of claim 8, wherein the causing step further includes:
   directing supercritical fluid to the compressor of the at least one additional core of the plurality of cores along the supercritical fluid cycle;
   compressing the supercritical fluid in the compressor of the at least one additional core such that the supercritical fluid is discharged from the compressor of the at least one additional core as a compressed supercritical fluid;
   mixing the compressed supercritical fluid discharged from the compressor of the at least one additional core with the mixture of supercritical fluid;
   directing at least a portion of the mixture of the supercritical fluid to the turbine of the at least one additional core;
   expanding the at least a portion of the mixture of the supercritical fluid in the turbine of the at least one additional core such that the at least one additional core increases the second level of power of the output device to the level of power equal to the total number of activated cores.

10. A system configured to generate power including at least a supercritical fluid cycle having a supercritical fluid flowing therethrough, the system comprising:
    a plurality of cores disposed along the supercritical fluid cycle, each core including a compressor and a turbine, each core configured to be selectively operated so as to generate a power output; and
    a plurality of heat exchangers disposed along the supercritical fluid cycle, at least one of the plurality of heat exchangers arranged so that supercritical fluid from the supercritical fluid cycle and air from an air breathing cycle passes therethrough but does not intermix, wherein the at least one heat exchanger is configured to be in fluid communication with each one of the plurality of cores;
    wherein a first core of the plurality of cores is configured to generate a first level of power when the first core is in operation, and a second core of the plurality of cores is configured to increase the first level of power to a second level of power that is greater than the first level of power when the first and second cores are in operation.

11. The system of claim 10, wherein the compressor of each core is configured to receive and compress a supercritical fluid and the turbine of each core is configured to receive and expand a supercritical fluid.

12. The system of claim 11, wherein at least one of the plurality of heat exchangers is configured to receive at least a portion of the supercritical fluid expanded in the turbine of at least one core of the plurality of cores, and at least a portion of the supercritical fluid compressed in the compressor of at least one core of the plurality of cores.

13. The system of claim 10, further comprising a controller that is configured to selectively direct the flow of supercritical fluid through the first core and at least the second core of the plurality of cores so as to adjust the number cores operating.

14. The system of claim 13, further comprising one or more valves operably connected to the controller and configured to control the flow of supercritical fluid through the plurality of cores.

15. The system of claim 14, wherein each of the plurality of cores further comprises a compressor input valve configured to control flow of the supercritical fluid into the compressor and a compressor discharge valve configured to control flow of the supercritical fluid from the compressor.

16. The system of claim 14, wherein each of the plurality of cores further comprises a turbine input valve configured to control flow of the supercritical fluid into the turbine and a turbine discharge valve configured to control flow of supercritical fluid from the supercritical fluid turbine.

17. The system of claim 10, further comprising at least one power device operable coupled to each core of the plurality of cores.

18. The system of claim 10, further comprising a plurality of power devices that are each operable coupled to a respective one of the plurality of cores.

19. The system of claim 17, wherein the power device is one of a generator, a turboprop, a turbofan, or a gearbox.

20. The system of claim 10, further comprising at least one cooler configured to reduce the temperature of the supercritical fluid.

21. An engine including a supercritical fluid cycle and an air-breathing cycle, the engine configured to produce multiple levels of power output, the engine comprising:
    a plurality of cores disposed along the supercritical fluid cycle, each core including a compressor and a turbine, each one of the compressor and the turbine of the plurality of cores including an inlet and an outlet;
    a first input conduit connected to the inlet of the compressor in each core;
    a first discharge conduit connected to the outlet of the compressor in each core;
    a second input conduit connected to the inlet of turbine in each core;
    a second discharge conduit connected to the outlet of the turbine in each core, wherein each core is configured to be selectively operated so as to generate a power output; and a plurality of heat exchangers disposed along the supercritical fluid cycle, at least one of the plurality of heat exchangers configured to be in fluid communication with each one of the plurality of cores, the plurality of heat exchangers configured to a) receive supercritical fluid from the first and second discharge conduits, and b) discharge supercritical fluid to the first and second input conduits, wherein the engine is configured to adjust the number of cores of the plurality cores in operation so as to adjust the levels of power output.

22. The engine of claim 21, wherein a first core of the plurality of cores is configured to generate a first level of power, and a second core of the plurality of cores is configured to increase the first level of power to a second level of power that is greater than the first level of power when the first and second cores are in operation.

23. The engine of claim 21, wherein the plurality of heat exchangers are configured to transfer heat from the air in the air-breathing cycle to at least a portion of the supercritical fluid from the first discharge conduit and to transfer heat from at least a portion of the supercritical fluid from the second discharge conduit to the air in the air-breathing cycle.

24. The engine of claim 21, further comprising a device to heat air in the air-breathing cycle.

25. The engine of claim 21, wherein the plurality of heat exchangers are configured for peak effective heat transfer when only one core of the plurality of cores is operational.

26. The system of claim 10, wherein the plurality of heat exchangers are configured for peak effective heat transfer when only one core of the plurality of cores is operational.

* * * * *